ical, and unpredictably. The overall effect is that the air pressure in the outlet is not accurately regulated.

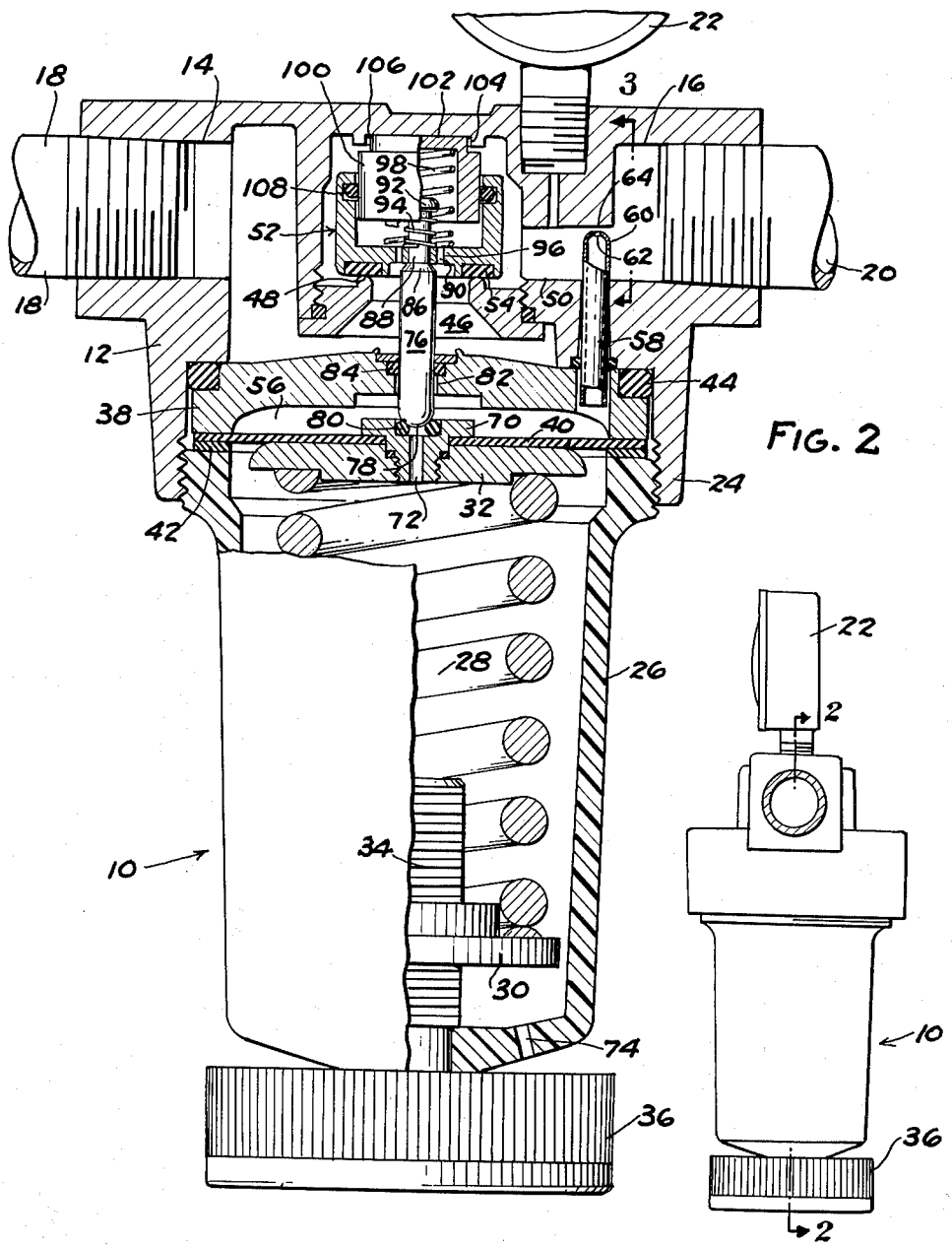

United States Patent Office 3,204,657
Patented Sept. 7, 1965

3,204,657
PRESSURE REGULATOR STRUCTURE
Keith A. Boyd, Mount Clemens, Mich., assignor to Master Pneumatic, Inc., Detroit, Mich., a corporation of Michigan
Filed Sept. 12, 1963, Ser. No. 308,455
6 Claims. (Cl. 137—484.8)

This invention relates to a pressure regulator of the type used to furnish air under regulated pressure to a conduit which conducts air under pressure to pneumatically operated equipment. The regulator has an inlet for air under line pressure, an outlet for air under regulated pressure, and a valve in a passageway between the inlet and outlet. The valve is urged toward open condition by a spring, and a diaphragm or piston subjected to the pressure of air in the outlet opposes the spring. The diaphragm yields to and overcomes the spring force responsive to pressure variations in the outlet to facilitate opening and closing of the valve.

In this type of regulator, the force of the valve-actuating spring is usually predetermined so that the valve will open and close at a desired pressure in the outlet. When a relatively large volume of air is being used by the equipment involved, the pressure drop in the outlet is relatively great and the dimensional variation in the valve-actuating spring is relatively large. Under these conditions, the spring rate decreases materially and the valve is not opened commensurately to the demand for air. Moreover, the valve for the same reason tends to close too quickly when air pressure in the outlet is partially restored.

Attempts have been made heretofore to compensate for the change in spring rate by extending a tube a relatively short distance into the outlet passageway, this tube being in pressure communication with the spring-opposing piston. The tubes used heretofore have been given various configurations and in some instances have been at least partially successful in compensating for the spring rate variation. None of them, however, has been entirely satisfactory in this regard. Moreover, such previous attempts have resulted in an undesirable turbulence in the air flow adjacent the port in the tube end within the passageway. This turbulence results in unpredictable pressure fluctuations causing the piston to oscillate erratically and unpredictably. The overall effect is that the air pressure in the outlet is not accurately regulated.

The object of the present invention is to provide a simple, inexpensive pressure regulator structure improved to accurately regulate pressure at the outlet and to facilitate smooth, predictable operation of the valve controlling device.

In general, the invention is carried out by providing adjacent the port which is in pressure communication with the outlet passageway and the valve controlling device a smoothly curved surface which cooperates with a wall of the passageway to provide adjacent the port a low turbulence Venturi restriction. As is brought out in the detailed description, this structure compensates for the change of spring rate and results in fluctuation-free operation of the valve controlling device in general. One form of the invention is shown in the accompanying drawings.

FIG. 1 is a generally elevational view of a pressure regulator embodying the present invention.

FIG. 2 is an enlarged generally sectional view on line 2—2 of FIG. 1 illustrating structural details of the regulator.

FIG. 3 is a further enlarged generally sectional view on line 3—3 of FIG. 2.

Shown in the drawing is a pressure regulator 10 having a body 12 defining an inlet 14 for receiving air under line pressure and an outlet 16 for air under regulated pressure. The inlet and outlet are threaded for reception of air lines 18 and 20 respectively. An air gauge 22 communicates with outlet 16 as illustrated. Head 12 has an extension 24 to which is threaded a housing 26 for a coil spring 28 adjustably compressed between retainer plates 30 and 32 by a screw 34 threaded through plate 30 and having a manual adjusting knob 36 thereon.

Spring housing 26 clamps a closure 38 against head 12 and a diaphragm 40 and retainer ring 42 are clamped between housing 26 and closure 38. An O-ring seal 44 is provided between head 12 and the closure.

Closure 38 cooperates with head 12 to define a passageway having a portion 46 upstream of a valve seat 48, and head 12 defines a passageway portion 50 downstream of the valve seat. A valve 52 carries a sealing element 54 toward and away from engagement with the valve seat for opening and closing the passageway.

Closure 38 and diaphragm 40 cooperate to define a sealed chamber 56 which communicates with outlet passageway 50, 16 through a tube 58 which projects almost entirely across passageway 50. The walls of the tube end projecting into the passageway are curved smoothly inwardly as at 60 and at the very end of the tube is a small diameter port 62 which is disposed closely adjacent a wall portion 64 of passageway 50 as shown. The inwardly rounded surfaces of the tube end cooperate with the opposed wall surface 64 to define a low turbulence Venturi restriction 66 (FIG. 3) at port 62. The function of this arrangement is described below. The tube end 60 is shown as having a generally spherical shape but could have other smoothly curved shapes as well. In satisfactorily operating regulators according to this invention, tube 58 has an outer diameter of about ⅛″, port 62 has a diameter in the range of about .025″ to .035″, and the distance between port 62 and wall 64 is in the range of about .040″ to .080″.

A fitting 70 passes through diaphragm 40 and is threaded top pressure plate 32. This fitting has a central port 72 which communicates into chamber 56 and the interior of spring housing 26. Housing 26 has a vent port 74. A control rod or pin 76 extends between fitting 70 and valve 52. One end 78 of the rod sealingly engages an O-ring 80 carried by fitting 70 for closing port 72. Rod 76 extends through an opening 82 in closure 38 and slidably engages and passes through an O-ring 84 which seals passageway 46 from chamber 56.

Control rod 76 has a shoulder 86 and a small diameter extension 88 which passes slidably through a central web 90 in valve 52. Extension 88 has a terminal head 92 against which a coil spring 94 is compressed, this spring reacting against the underside of web 90, thereby yieldably urging shoulder 86 against the top of the web.

Valve 52 has ports 96 through which line pressure of air in passageway portion 46 is communicated to the under surfaces (actually the top surfaces as FIG. 2 is viewed) of valve 52, thereby exerting force on the valve urging it toward the closed condition illustrated. A compressed coil spring 98 assists in biasing the valve toward closed condition.

Valve 52 is cup shaped and surrounds a plug 100 having a bottom portion 102 fitting in a socket 104 in regulated body 12. A clearance 106 is provided between the socket walls and plug to enable the plug and valve 52 to shift laterally so that valve and control rod 76 can center themselves with respect to the other components with which they cooperate. Valve 52 carries an O-ring 108 engaged with plug 100 to provide a seal between the line pressure and regulated pressure sides of the valve.

In operation, when air in downstream conduit 20 is at the desired regulated pressure, valve 52 is closed and the parts are in the condition illustrated in FIG. 2. When pressure in conduit 20 and outlet 16 drops as when pneumatic equipment downstream of the regulator is operated, the pressure drop is communicated through port 62 and tube 58 to chamber 56. Spring 28 through pressure plate 32 depresses diaphragm 40, thereby pushing control rod 76 upwardly as FIG. 2 is viewed to open valve 52 and admit air under line pressure from conduit 18 through the valve opening to downstream passageway 50. When the proper pressure level is restored in outlet 16, the pressure of air in chamber 56 returns diaphragm 40 against the action of spring 28 to permit valve 52 to close.

In the event that pressure in conduit 20 should build up above the desired pressure, the increase is communicated to chamber 56 which causes diaphragm 40 to move downwardly as FIG. 2 is viewed against the action of spring 28 to withdraw seal 80 from contact with the end 78 of control rod 76, thereby opening port 72 to permit escape of air into housing 26 and out through vent port 74 until the proper pressure level is restored. Then spring 28 returns diaphragm 40 and engages seal 80 against the control rod to close port 72. Spring 94, acting on head 92, resists movement of control rod 76 with seal 80 to obtain nearly instantaneous opening of port 72 upon downward movement of diaphragm 40.

The regulator is set to maintain a desired pressure in outlet 16 by turning control knob 36 and screw 34, thereby shifting pressure plate 30 and regulating the stress in spring 28. However, when spring 28 expands by even a few thousandths of an inch in opening valve 52, its rate decreases and it, by itself, is no longer effective to maintain the desired pressure in outlet 16. This situation is aggravated where the demand for air is relatively high: The greater the demand, the greater the loss of spring rate, and the greater would be the deficiency in the amount of air furnished in the absence of compensating structure.

When air passes through passageway 60 responsive to opening of valve 52, a portion of the air flows through the Venturi restriction 66 created by tube end 60 and wall portion 64 of the passageway. The static pressure at this restriction is lower than the static pressure at other portions of passageway 50. This lower static pressure is communicated through port 62 and tube 58 to chamber 56. This diminishes the amount of force which diaphragm 40 exerts in opposition to spring 28 and in effect increases the effectiveness of the spring to open valve 52. Thus, the decrease of the rate of spring 28 is compensated by the lower static pressure at Venturi restriction 66.

The pressure differential between restriction 66 and the other portions of passageway 50 is generally proportional to the rate of flow of air through passageway 50. Thus, the greater the demand for air, the lower will be the static pressure communicated to chamber 56. This facilitates opening of valve 52 by spring 28 adequately to meet any demands for which the regulator is designed despite the loss of spring rate.

The rounded configuration of tube end 60 results in a smooth, relatively turbulent-free flow of air through Venturi restriction 66. Therefore, there is little or no fluctuation in the static pressure at the restriction or in port 62, tube 58, or chamber 56. The result is that diaphragm 40 moves smoothly and predictably without fluctuation and the pressure in outlet 16 is accurately controllable.

I claim:
1. In a pressure regulator having a pressure regulating valve disposed between an inlet and an outlet and being actuated by a device responsive to pressure variations between said valve and outlet, improved structure for controlling the action of said pressure responsive device comprising,
   a passageway in said regulator between said valve and outlet, said passageway having a wall portion,
   a tube in pressure-communicating relation to said passageway and said device,
   a said tube having a portion which projects into said passageway, said tube portion having a port, said port being disposed closely adjacent said wall portion of said passageway,
   said tube having adjacent said port exterior wall portions which are curved smoothly inwardly toward said port, said wall portions of said tube and passageway cooperating to define a low turbulence Venturi restriction adjacent said port,
   so that the static pressure communicated to said device through said port responsive to air flow in said passageway is generally free of turbulence variations and is lower than the pressure in portions of said passageway outside of the influence of said Venturi restriction,
   said passageway having an effective sectional area greater than the diameter of said tube portion, the difference between said effective area and diameter being greater than the spacing between said port and wall portion, whereby to pass most of the air flowing through said passageway substantially free of the restrictive influence of said Venturi restriction.
2. The improved structure defined in claim 1 wherein said tube has both inner and outer diameters which are greater than the diameter of said port.
3. The improved structure defined in claim 1 wherein said tube portion has an end containing said port, said exterior wall portions having generally spherical shape.
4. The improved structure defined in claim 3 wherein said port and spherical shape have axes which are substantially perpendicular to the direction of air flow in said passageway.
5. The improved structure defined in claim 1 wherein said tube portion extends generally diametrically across a major portion of said passageway and has an end containing said support.
6. The improved structure defined in claim 1 wherein said tube portion is substantially straight and extends substantially diametrically across a major portion of said passageway, said tube portion having wall portions adjacent an end formed generally spherically inwardly, said port being provided at said tube end and having a diameter smaller than the general diameter of said tube portion.

References Cited by the Examiner
UNITED STATES PATENTS

| | | | |
|---|---|---|---|
| 869,830 | 10/07 | Dalen | 137—484.2 |
| 2,661,578 | 12/53 | Niesemann | 137—484.8 |
| 2,890,713 | 6/59 | Semon | 137—484.8 |

FOREIGN PATENTS

| | | |
|---|---|---|
| 5,595 | 19/04 | Great Britain. |

M. CARY NELSON, *Primary Examiner.*

MARTIN P. SCHWADRON, *Examiner.*